(12) United States Patent
Kakura et al.

(10) Patent No.: US 7,526,041 B2
(45) Date of Patent: Apr. 28, 2009

(54) CHANNEL ESTIMATION CIRCUIT AND CHANNEL ESTIMATION METHOD

(75) Inventors: Yoshikazu Kakura, Minato-ku (JP); Hiroyuki Atarashi, Yokohama (JP); Noriyuki Maeda, Yokohama (JP)

(73) Assignees: NEC Corporation, Tokyo (JP); NTT DoCoMo, Inc., Tokyo (JP)

( * ) Notice: Subject to any disclaimer, the term of this patent is extended or adjusted under 35 U.S.C. 154(b) by 594 days.

(21) Appl. No.: 10/554,097

(22) PCT Filed: Apr. 26, 2004

(86) PCT No.: PCT/JP2004/006011

§ 371 (c)(1),
(2), (4) Date: Oct. 21, 2005

(87) PCT Pub. No.: WO2004/095750

PCT Pub. Date: Nov. 4, 2004

(65) Prior Publication Data

US 2006/0222119 A1  Oct. 5, 2006

(30) Foreign Application Priority Data

Apr. 24, 2003  (JP)  ............... 2003-119777

(51) Int. Cl.
H04B 15/00 (2006.01)
H04B 1/69 (2006.01)

(52) U.S. Cl. ...................... 375/285; 375/147

(58) Field of Classification Search ......... 375/285, 375/141, 147, 152, 143, 322; 370/203, 208
See application file for complete search history.

(56) References Cited

U.S. PATENT DOCUMENTS

| | | | |
|---|---|---|---|
| 6,510,143 B1 | 1/2003 | Bejjani et al. | |
| 2003/0223355 A1* | 12/2003 | Pan et al. | 370/210 |
| 2004/0071193 A1* | 4/2004 | Atarashi et al. | 375/144 |
| 2004/0196891 A1* | 10/2004 | Tapaninen | 375/148 |

FOREIGN PATENT DOCUMENTS

| | | |
|---|---|---|
| JP | 10-051424 A | 2/1998 |
| JP | 10-190522 A | 7/1998 |

(Continued)

*Primary Examiner*—Khai Tran
(74) *Attorney, Agent, or Firm*—Sughrue Mion, PLLC

(57) ABSTRACT

A channel estimation circuit of the present invention includes: a tentative channel estimation unit for performing channel estimation by making use of a received signal and outputting the result of estimation as a tentative channel estimation signal; a noise/interference power estimation unit for estimating noise and interference power by making use of the received signal and outputting the result of estimation as a noise/interference power estimation signal; a threshold decision unit for establishing a threshold signal by making use of the noise/interference power estimation signal to output the threshold signal; and an effective path detection unit for outputting, as a channel estimation signal, paths of the tentative channel estimation signal that remains after noise paths having powers smaller than the threshold signal have been removed.

12 Claims, 4 Drawing Sheets

FOREIGN PATENT DOCUMENTS

| | | |
|---|---|---|
| JP | 2911117 B1 | 4/1999 |
| JP | 2000-078110 A | 3/2000 |
| JP | 2000-134135 A | 5/2000 |
| JP | 2000-261412 A | 9/2000 |
| JP | 2002-094412 A | 3/2002 |
| JP | 2002-111542 A | 4/2002 |
| KR | 1996-15842 B1 | 11/1996 |
| KR | 2001-28160 A | 4/2001 |
| KR | 2001-43357 A | 5/2001 |
| WO | WO 01/03309 A2 | 1/2001 |

* cited by examiner

CHANNEL ESTIMATION CIRCUIT AND CHANNEL ESTIMATION METHOD

TECHNICAL FIELD

The present invention relates to a channel estimation circuit and a channel estimation method for implementing channel estimation adaptively in accordance with noise and interference power levels.

BACKGROUND ART

In conventional channel estimation circuits, improvements of the S/N ratio in channel estimation have been often contemplated wherein a threshold is set and noise paths having a level equal to or lower than the threshold are removed (see Japanese Patent Application Laid-open 2000-261412, for example).

FIG. 1 shows an example of construction of a conventional channel estimation circuit.

As shown in FIG. 1, channel estimation circuit 401 of this conventional example includes, tentative channel estimation unit 102, threshold decision unit 404, and effective path detection unit 105.

Tentative channel estimation unit 102 is supplied with received signal $S_r$ and performs channel estimation by making use of a pilot signal contained in received signal $S_r$ and outputs the result of estimation as tentative channel estimation signal $S_{tcest}$.

Threshold decision unit 404 establishes and outputs threshold signal $S_{th}$.

Effective path detection unit 105 is supplied with tentative channel estimation signal $S_{tcest}$ and threshold signal $S_{th}$ and, after removing noise paths having powers smaller than threshold signal $S_{th}$ among paths of the tentative channel estimation signal $S_{tcest}$, outputs the remaining signal as channel estimation signal $S_{cest}$.

However, the conventional channel estimation circuit shown in FIG. 1 suffers from a problem that the advantage of the removal of noise paths by making use of a threshold cannot be sufficiently obtained in a transmission environment in which noise and interference power levels greatly vary.

DISCLOSURE OF THE INVENTION

It is therefore an object of the present invention to provide a channel estimation circuit and a channel estimation method that adaptively remove noise paths in accordance with noise and interference power levels, to thereby achieve high-precision channel estimation in a transmission environment in which noise and interference power levels greatly vary.

A channel estimation circuit of the present invention includes: a tentative channel estimation means for being input with a received signal and performing channel estimation by making use of the received signal and outputting the result of estimation as a tentative channel estimation signal; a noise/interference power estimation means for being input with signals, including at least, the received signal, among the received signal, the tentative channel estimation signal and a channel estimation signal, and performing estimation of noise and interference power by making use of the input signals, to output the result of estimation as a noise/interference power estimation signal; a threshold decision means for being input with signals, including at least, the noise/interference power estimation signal, among the noise/interference power estimation signal and the tentative channel estimation signal, and establishing and outputting a threshold signal by making use of the input signals; and an effective path detection means for being input with the tentative channel estimation signal and the threshold signal and, after removing noise paths having powers smaller than threshold signal among paths of the tentative channel estimation signal, and outputting the remaining signal as the channel estimation signal.

A channel estimation method of the present invention includes: a step at which a tentative channel estimation means being input with a received signal and performs channel estimation by making use of the received signal and outputs the result of estimation as a tentative channel estimation signal; a step at which a noise/interference power estimation means being input with signals, including, at least, the received signal, among the received signal, the tentative channel estimation signal and a channel estimation signal, and performs estimation of noise and interference power by making use of the input signals, to output the result of estimation as a noise/interference power estimation signal; a step at which a threshold decision means being input with signals, including at least, the noise/interference power estimation signal, among the noise/interference power estimation signal and the tentative channel estimation signal, to establish and output a threshold signal by making use of the input signals; and a step at which an effective path detection means being input with the tentative channel estimation signal and the threshold signal and, after removing noise paths having powers smaller than threshold signal among paths of the tentative channel estimation signal, outputs the remaining signal as the channel estimation signal.

As described above, since a threshold is determined based on the estimation values of noise and interference power and removal of noise paths is performed based on that threshold, the present invention enables high-precision channel estimation even in a transmission environment in which noise and interference power levels vary greatly.

BEST MODE FOR CARRYING OUT THE INVENTION

Preferred embodiments of the present invention will be described hereinbelow in detail with reference to the drawings.

The First Embodiment

Figure 1:
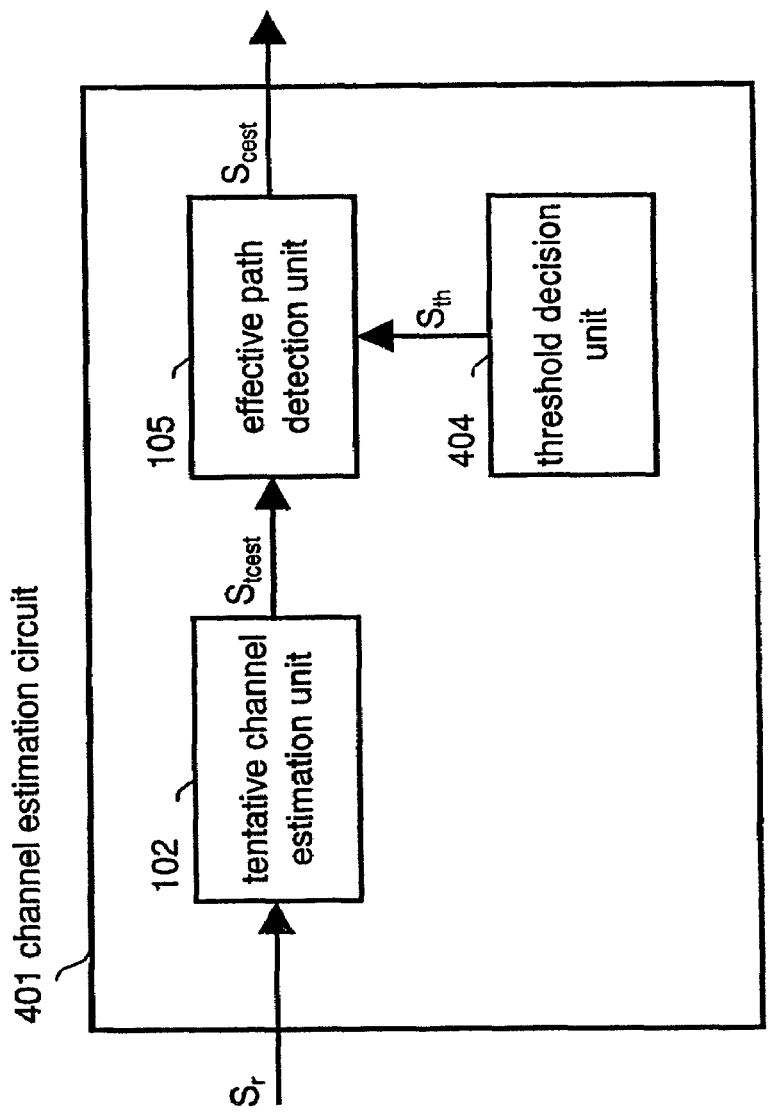
FIG. 1 is a block diagram showing an example of construction of a conventional channel estimation circuit.
Figure 2:
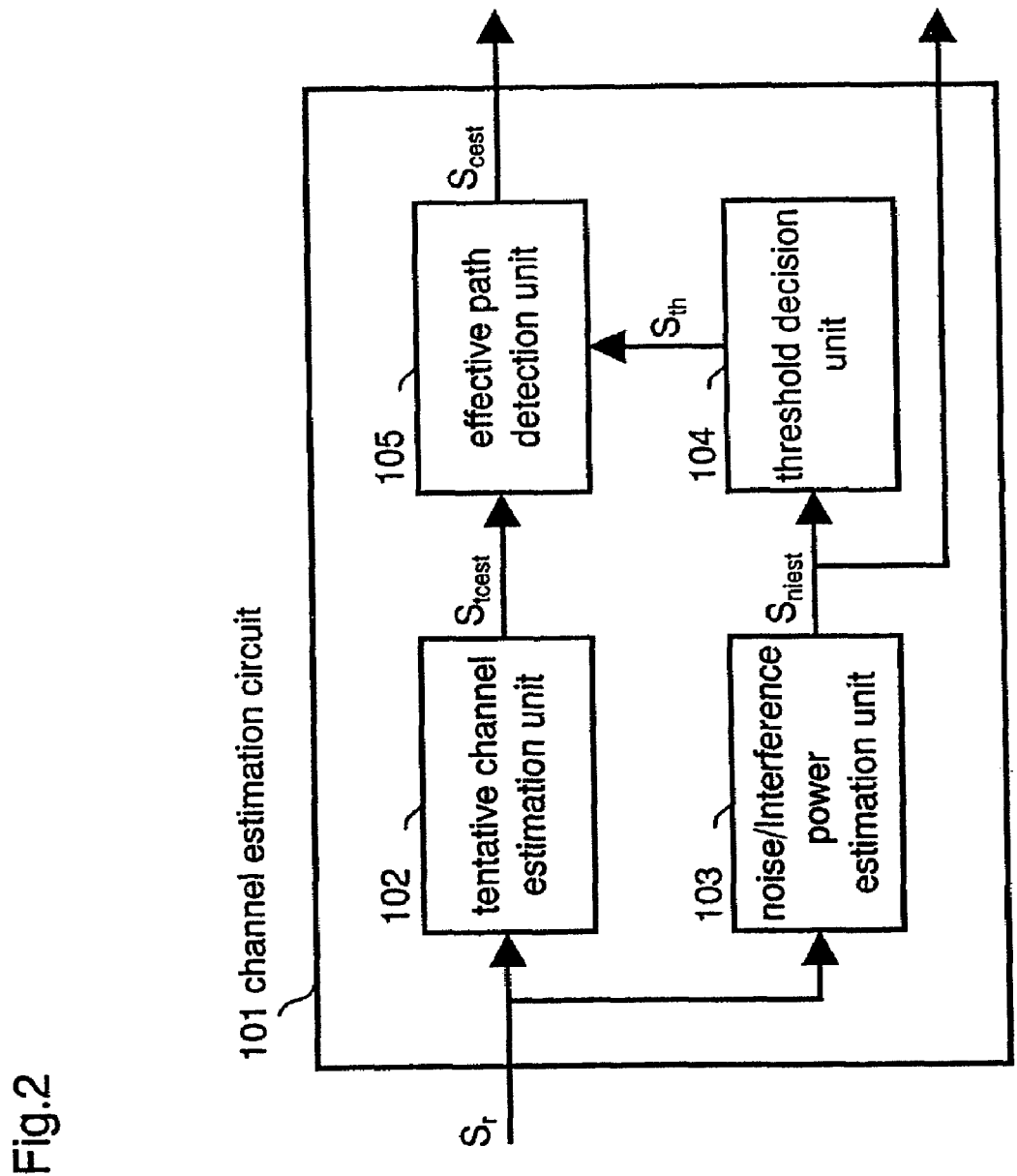
FIG. 2 is a block diagram showing a configuration of a channel estimation circuit in accordance with the first embodiment of the present invention.

FIG. 2 shows a configuration of a channel estimation circuit in accordance with the first embodiment of the present invention. In FIG. 2, the same components as in FIG. 1 are assigned the same reference numerals.

As shown in FIG. 2, channel estimation circuit 101 according to the first embodiment of the present invention includes tentative channel estimation unit 102, noise/interference power estimation unit 103, threshold decision unit 104 and effective path detection unit 105.

Tentative channel estimation unit 102 is supplied with received signal $S_r$ and performs channel estimation by making use of a pilot signal contained in received signal $S_r$ and outputs the result of estimation as tentative channel estimation signal $S_{tcest}$.

Noise/interference power estimation unit 103 is supplied with received signal $S_r$, estimates noise and interference power by making use of received signal $S_r$, and then output the result of estimation as noise/interference power estimation signal $S_{niest}$.

Threshold decision unit 104 is supplied with noise/interference power estimation signal $S_{niest}$ and, after having multiplied the noise/interference power estimation signal $S_{niest}$ by an arbitrary constant, outputs the signal as threshold signal $S_{th}$.

Effective path detection unit 105 is supplied with tentative channel estimation signal $S_{tcest}$ and threshold signal $S_{th}$ and, after removing noise paths having powers smaller than threshold signal $S_{th}$ among paths of the tentative channel estimation signal $S_{tcest}$, outputs the remaining signal as channel estimation signal $S_{cest}$.

It is to be noted that, for instance, when CDMA (Code Division Multiple Access) is used for wireless transmission, as a method of estimating noise and interference power, noise/interference power estimation unit 103 can employ a method of despreading received signal $S_r$ by making use of a spread code that is not used for wireless transmission so as to cancel out the signal component, to thereby extract noise and interference components alone.

As described above, in the present embodiment, the threshold for removal of noise paths is determined adaptively in accordance with noise and interference power levels. This makes it possible to attain high-precision channel estimation even in a transmission environment in which noise and interference power levels vary greatly.

The Second Embodiment

Figure 3:
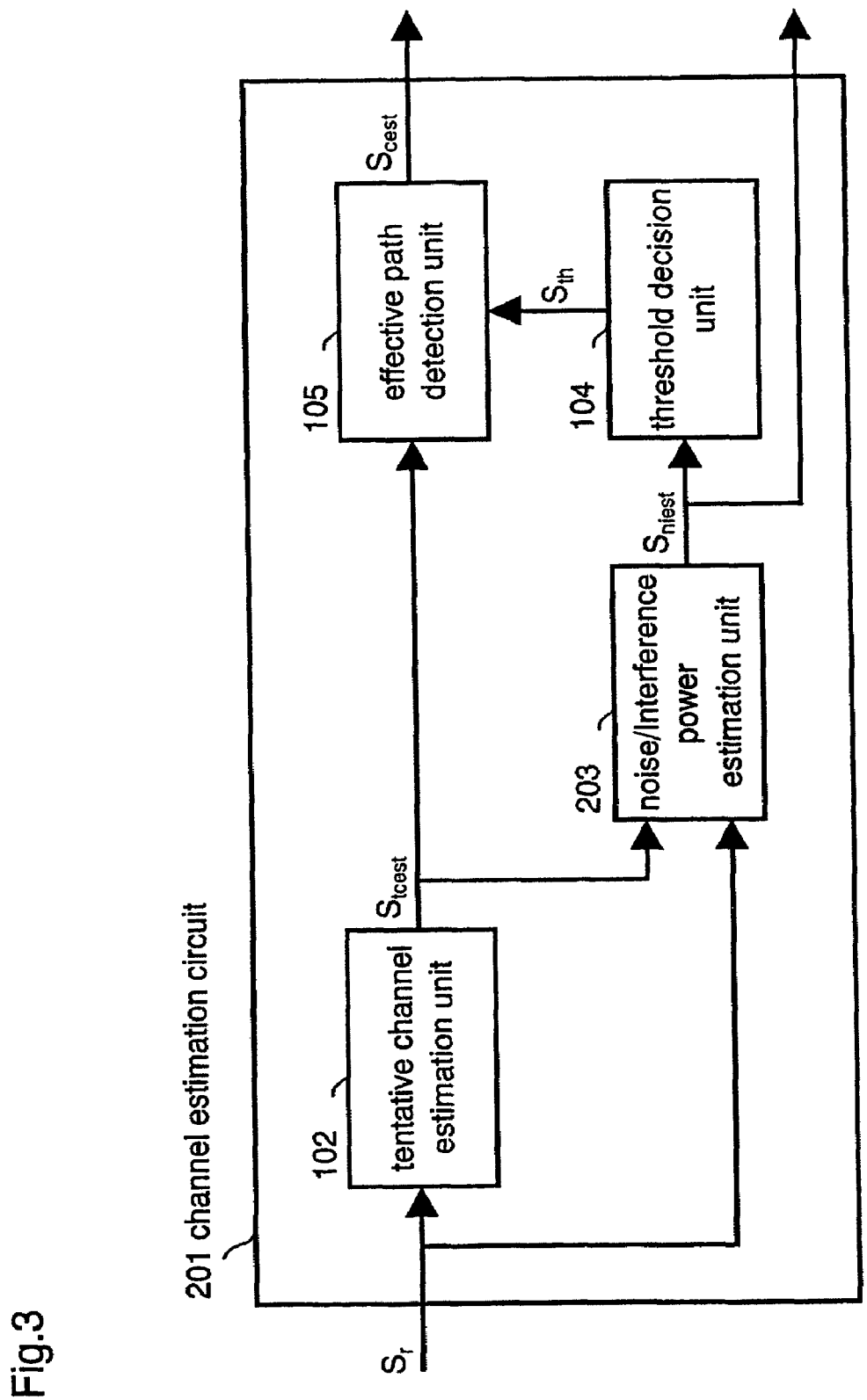
FIG. 3 is a block diagram showing a configuration of a channel estimation circuit in accordance with the second embodiment of the present invention.

FIG. 3 shows a configuration of a channel estimation circuit in accordance with the second embodiment of the present invention. In FIG. 3, the same components as in FIG. 2 are assigned with the same reference numerals.

As shown in FIG. 3, channel estimation circuit 201 according to the second embodiment of the present invention includes tentative channel estimation unit 102, noise/interference power estimation unit 203, threshold decision unit 104 and effective path detection unit 105.

Tentative channel estimation unit 102 is supplied with received signal $S_r$ and performs channel estimation by making use of a pilot signal contained in received signal $S_r$ and outputs the result of estimation as tentative channel estimation signal $S_{tcest}$.

Noise/interference power estimation unit 203 is supplied with received signal $S_r$ and tentative channel estimation signal $S_{tcest}$, and estimates noise and interference power by making use of received signal $S_r$ and tentative channel estimation signal $S_{tcest}$, and then output the result of estimation as noise/interference power estimation signal $S_{niest}$.

Threshold decision unit 104 is supplied with noise/interference power estimation signal $S_{niest}$ and, after having multiplied the noise/interference power estimation signal $S_{niest}$ by an arbitrary constant, outputs the signal as threshold signal $S_{th}$.

Effective path detection unit 105 is supplied with tentative channel estimation signal $S_{tcest}$ and threshold signal $S_{th}$ and, after removing noise paths having powers smaller than threshold signal $S_{th}$ among paths of the tentative channel estimation signal $S_{tcest}$, outputs the remaining signal as channel estimation signal $S_{cest}$.

It is to be noted that, for instance, when CDMA is used for wireless transmission, noise/interference power estimation unit 203 can employ a method of determining the variance of received signal $S_r$ relative to tentative channel estimation signal $S_{tcest}$, as a method of estimating noise and interference power.

As described above, in the present embodiment, the threshold for removal of noise paths is determined adaptively in accordance with noise and interference power levels. This makes it possible to attain high-precision channel estimation even in a transmission environment in which noise and interference power levels vary greatly.

Further, in the present embodiment, noise and interference power are estimated by a method such as determining the variance of received signal $S_r$ relative to tentative channel estimation signal $S_{tcest}$. This enables more accurate estimation of noise and interference power. In this case, however, the degradation in the accuracy of estimation of tentative channel estimation signal $S_{tcest}$ also results in the degradation in the accuracy of estimation of noise and interference power.

The Third Embodiment

Figure 4:
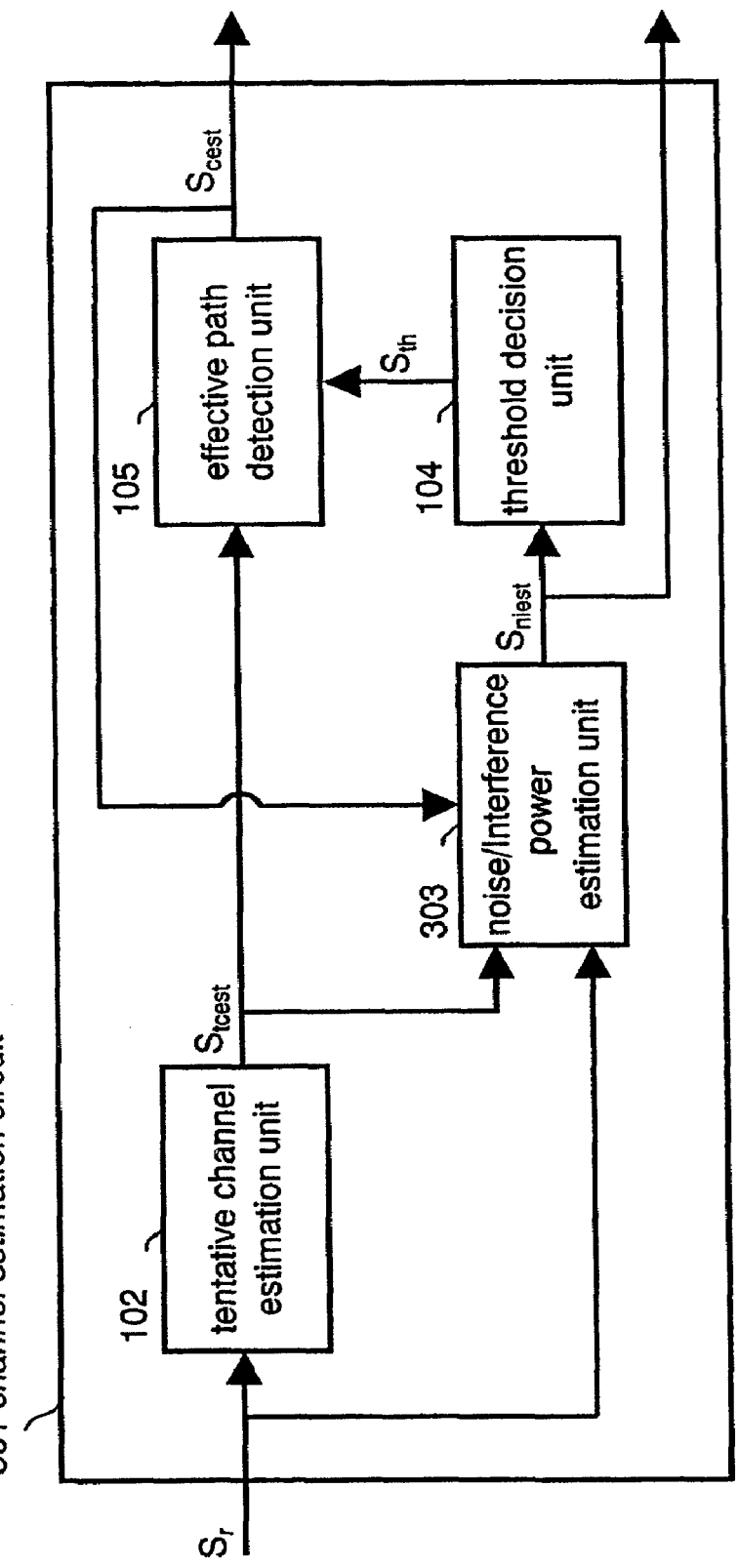
FIG. 4 is a block diagram showing a configuration of a channel estimation circuit in accordance with the third embodiment of the present invention.

FIG. 4 shows a configuration of a channel estimation circuit in accordance with the third embodiment of the present invention. In FIG. 4, the same components as in FIG. 2 are assigned with the same reference numerals.

As shown in FIG. 4, channel estimation circuit 301 according to the third embodiment of the present invention includes tentative channel estimation unit 102, noise/interference power estimation unit 303, threshold decision unit 104 and effective path detection unit 105.

Tentative channel estimation unit 102 is supplied with received signal $S_r$ and performs channel estimation by making use of a pilot signal contained in received signal $S_r$ and outputs the result of estimation as tentative channel estimation signal $S_{tcest}$.

Noise/interference power estimation unit 303 is supplied with received signal $S_r$, tentative channel estimation signal $S_{tcest}$ and channel estimation signal $S_{cest}$, estimates noise and interference power, and then output the result of estimation as noise/interference power estimation signal $S_{niest}$.

Threshold decision unit 104 is supplied with noise/interference power estimation signal $S_{niest}$ and, after having multiplied the noise/interference power estimation signal $S_{niest}$ by an arbitrary constant, outputs the signal as threshold signal $S_{th}$.

Effective path detection unit 105 is supplied with tentative channel estimation signal $S_{tcest}$ and threshold signal $S_{th}$ and, after removing noise paths having powers smaller than threshold signal $S_{th}$ among paths of the tentative channel estimation signal $S_{tcest}$, outputs the remaining signal as channel estimation signal $S_{cest}$.

It is to be noted that, upon the first estimation of noise and interference power, i.e., prior to the input of channel estimation signal $S_{cest}$, noise/interference power estimation unit 303 implements estimation of noise and interference power, by making use of received signal $S_r$ and tentative channel estimation signal $S_{tcest}$. In this case, noise/interference power estimation unit 303 can employ, for example a method of determining the variance of received signal $S_r$ relative to tentative channel estimation signal $S_{tcest}$, as a method of estimating of noise and interference power.

On the other hand, after the channel estimation values, that have been obtained by removal of noise paths by making use of the threshold established based on the first estimation values of noise and interference power, are input as channel estimation signal $S_{cest}$, noise/interference power estimation unit 303 performs estimation of noise and interference power by making use of received signal $S_r$ and channel estimation signal $S_{cest}$. In this case, noise/interference power estimation unit 303 can employ, for example a method of determining the variance of received signal $S_r$ relative to channel estimation signal $S_{cest}$, as a method of estimating of noise and interference power.

As described above, in the present embodiment, the threshold for removal of noise paths is determined adaptively in accordance with noise and interference power levels. This makes it possible to attain high-precision channel estimation even in a transmission environment in which noise and interference power levels vary greatly.

Further, in the present embodiment, at the first estimation of noise and interference power, noise and interference power are estimated by a method such as determining the variance of received signal $S_r$ relative to tentative channel estimation signal $S_{tcest}$, whereas, after channel estimation signal $S_{cest}$ has been determined for the channel estimation values that have been obtained by removal of noise paths by making use of the threshold established based on the first estimation values of noise and interference power, noise and interference power are re-estimated by a method such as determining the variance of received signal $S_r$ relative to channel estimation signal $S_{cest}$. This enables a more accurate estimation of noise and interference power. The procedure to remove noise paths repeatedly by making use of more accurate estimation values of noise and interference power is also possible.

The Fourth Embodiment

Although, in the above first to third embodiments, threshold decision unit 104 is supplied with noise/interference power estimation signal $S_{niest}$ and establishes threshold signal $S_{th}$ by making use of noise/interference power estimation signal $S_{niest}$, the present invention should not be limited to thereto. Threshold decision unit 104 may be constructed such that it will input not only noise/interference power estimation signal $S_{niest}$ but also tentative channel estimation signal $S_{tcest}$ and establish threshold signal $S_{th}$ by making use of noise/interference power estimation signal $S_{niest}$ and tentative channel estimation signal $S_{tcest}$.

With this configuration, threshold decision unit 104 may employ, for example, the following first and second methods as a method of establishing of threshold signal $S_{th}$.

In the first method, threshold decision unit 104 initially sets the signal as threshold signal $S_{th}$ after having multiplied the noise/interference power estimation signal $S_{niest}$ by an arbitrary constant, at first. Next, threshold decision unit 104 subtracts x, x being an arbitrary real number, from the maximum path power, which is the power of the path having the maximum power among the paths of tentative channel estimation signal $S_{tcest}$. Then, when the value, that is, the maximum path power minus x, is greater than the initially set threshold signal $S_{th}$, threshold decision unit 104 outputs the initially set threshold signal $S_{th}$, and when the maximum path power minus x is equal to or smaller than the initially set threshold signal $S_{th}$, threshold decision unit 104 outputs the maximum path power minus x as threshold signal $S_{th}$.

In the second method, threshold decision unit 104 initially sets the signal as threshold signal $S_{th}$ after having multiplied the noise/interference power estimation signal $S_{niest}$ by an arbitrary constant, at first. Next, threshold decision unit 104 calculates, as a total effective power, the sum of the powers of the paths having powers which are equal to or greater than threshold signal $S_{th}$ among paths of tentative channel estimation signal $S_{tcest}$. Then, when the total effective power is equal to or greater than y, y being an arbitrary real number, threshold decision unit 104 outputs the initially set threshold signal $S_{th}$, and when the total effective power is smaller than y, threshold decision unit 104 lowers threshold signal $S_{th}$ until the total effective power becomes equal to greater than y, and then outputs that threshold signal $S_{th}$.

The invention claimed is:

1. A channel estimation circuit comprising:
   a tentative channel estimation means for being input with a received signal and performing channel estimation by making use of the received signal and outputting the result of estimation as a tentative channel estimation signal;
   a noise/interference power estimation means for being input with signals, including at least, the received signal, among the received signal, the tentative channel estimation signal and a channel estimation signal, and performing estimation of noise and interference power by making use of the input signals, to output the result of estimation as a noise/interference power estimation signal;
   a threshold decision means for being input with signals, including at least, the noise/interference power estimation signal, among the noise/interference power estimation signal and the tentative channel estimation signal, and establishing and outputting a threshold signal by making use of the input signals; and
   an effective path detection means for being input with the tentative channel estimation signal and the threshold signal and, after removing noise paths having powers smaller than the threshold signal among paths of the tentative channel estimation signal, outputting the remaining signal as the channel estimation signal.

2. The channel estimation circuit according to claim 1, wherein the threshold decision means outputs the signal as the threshold signal, after having multiplied the noise/interference power estimation signal by an arbitrary constant.

3. The channel estimation circuit according to claim 1, wherein the noise/interference power estimation means performs estimation of noise and interference power, by making use of the received signal and the tentative channel estimation signal before the channel estimation signal is input, and performs estimation of noise and interference power, by making use of the received signal and the channel estimation signal after the channel estimation signal has been input.

4. The channel estimation circuit according to claim 1, wherein the threshold decision means initially sets the signal as the threshold signal after having multiplied the noise/interference power estimation signal by an arbitrary constant, subtracts x, x being an arbitrary real number, from a maximum path power, which is the power of the path having the maximum power among the paths of the tentative channel estimation signal, outputs the initially established threshold signal when the maximum path power minus x is greater than the initially established threshold signal, and outputs the maximum path power minus x as the threshold signal when the maximum path power minus x is equal to or smaller than the initially established threshold signal.

5. The channel estimation circuit according to claim 1, wherein the threshold decision means initially sets the signal as the threshold signal after having multiplied the noise/interference power estimation signal by an arbitrary constant, calculates the sum of the powers of the paths having powers which are equal to or greater than the initially established threshold signal among paths of the tentative channel estimation signal as a total effective power, outputs the initially established threshold signal when the total effective power becomes equal to or greater than y, y being an arbitrary real number, and lowers the threshold signal until the total effective power is equal to greater than y when the total effective power is smaller than y and then outputs that threshold signal.

6. A channel estimation method comprising:
- a step at which a tentative channel estimation means being input with a received signal and performs channel estimation by making use of the received signal and outputs the result of estimation as a tentative channel estimation signal;
- a step at which a noise/interference power estimation means being input with signals, including at least, the received signal, among the received signal, the tentative channel estimation signal and a channel estimation signal, and performs estimation of noise and interference power by making use of the input signals, to output the result of estimation as a noise/interference power estimation signal;
- a step at which a threshold decision means being input with signals, including at least, the noise/interference power estimation signal, among the noise/interference power estimation signal and the tentative channel estimation signal, to establish and output a threshold signal by making use of the input signals; and
- a step at which an effective path detection means being input with the tentative channel estimation signal and the threshold signal and, after removing noise paths having powers smaller than threshold signal among paths of the tentative channel estimation signal, outputs the remaining signal as the channel estimation signal.

7. A channel estimation circuit comprising:
- a tentative channel estimation unit that performs a channel estimation by using a received signal and outputs the channel estimation as a tentative channel estimation signal;
- a noise/interference power estimation unit that is input with signals comprising at least the received signal among the received signal, the tentative channel estimation signal, and a channel estimation signal, performs an estimation of noise and interference power by making use of the input signals, and outputs the result of the estimation as a noise/interference power estimation signal;
- a threshold decision unit that is input with the noise/interference power estimation signal and optionally the tentative channel estimation signal, and establishes and outputs a threshold signal using the noise/interference power estimation signal and, if input, the tentative channel estimation signal; and
- an effective path detection unit that is input with the tentative channel estimation signal and the threshold signal and, after removing noise paths having powers smaller than threshold signal among paths of the tentative channel estimation signal, outputs a resulting signal as the channel estimation signal.

8. The channel estimation circuit according to claim 7, wherein the threshold decision unit outputs the threshold signal after multiplying the noise/interference power estimation signal by an arbitrary constant.

9. The channel estimation circuit according to claim 7, wherein the noise/interference power estimation unit performs the estimation of noise and interference power by using the received signal and the tentative channel estimation signal before the channel estimation signal is input, and performs the estimation of noise and interference power by making use of the received signal and the channel estimation signal after the channel estimation signal has been input.

10. The channel estimation circuit according to claim 7, wherein the threshold decision unit:
- initially establishes the threshold signal as the noise/interference power estimation signal multiplied by an arbitrary constant;
- subtracts X, X being an arbitrary real number, from a maximum path power, which is the power of the path having the maximum power among the paths of the tentative channel estimation signal;
- outputs the initially established threshold signal when the maximum path power minus X is greater than the initially established threshold signal; and
- outputs the maximum path power minus X as the threshold signal when the maximum path power minus X is equal to or smaller than the initially established threshold signal.

11. The channel estimation circuit according to claim 7, wherein the threshold decision unit:
- initially establishes the threshold signal as the noise/interference power estimation signal multiplied by an arbitrary constant;
- calculates a total effective power which is a sum of the powers of the paths having power which is equal to or greater than the initially established threshold signal among the paths of the tentative channel estimation signal;
- outputs the initially established threshold signal when the total effective power is equal to or greater than Y, Y being an arbitrary real number, and
- lowers the threshold signal until the total effective power is equal to greater than Y when the total effective power is smaller than Y and then outputs that threshold signal.

12. A channel estimation method comprising:
- inputting a received signal to a tentative channel estimation unit;
- performing, by the tentative channel estimation unit, a tentative channel estimation using the received signal;
- outputting a tentative channel estimation signal from the tentative channel estimation unit;
- inputting to a noise/interference power estimation unit the received signal and optionally at least one of the tentative channel estimation signal and a channel estimation signal;
- performing, by the noise/interference power estimation unit, an estimation of noise and interference power using the received signal, and if present, the at least one of the tentative channel estimation signal and the channel estimation signal;
- outputting from the noise/interference power estimation unit a noise/interference power estimation signal;
- inputting to a threshold decision unit the noise/interference power estimation signal and optionally the tentative channel estimation signal;
- outputting from the threshold decision unit a threshold signal using the noise/interference power estimation signal and, if present, the tentative channel estimation signal;
- inputting to an effective path detection unit the tentative channel estimation signal and the threshold signal;
- generating, by the effective path detection unit, the channel estimation signal by removing noise paths with powers smaller than the threshold signal among paths of the tentative channel estimation signal; and
- outputting the channel estimation signal from the effective path detection unit.

* * * * *